United States Patent
Perez et al.

(10) Patent No.: US 7,695,010 B2
(45) Date of Patent: Apr. 13, 2010

(54) INFLATOR WITH FRANGIBLE SUPPORT

(75) Inventors: Michael Perez, Ogden, UT (US); Scott Jackson, Centerville, UT (US); Anthony M. Young, Malad, ID (US); Brent A. Parks, Englewood, CO (US); David Green, Brigham City, UT (US); Greg Lanham, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/070,471

(22) Filed: Feb. 19, 2008

(65) Prior Publication Data

US 2009/0206586 A1      Aug. 20, 2009

(51) Int. Cl.
    *B60R 21/26* (2006.01)
(52) U.S. Cl. .................................................. 280/737
(58) Field of Classification Search ................. 280/737, 280/736, 740, 741
    See application file for complete search history.

(56) References Cited

U.S. PATENT DOCUMENTS

| | | | |
|---|---|---|---|
| 5,536,040 A * | 7/1996 | Cuevas et al. ............... 280/737 |
| 5,603,525 A | 2/1997 | Zakula | |
| 6,189,926 B1 * | 2/2001 | Smith .......................... 280/737 |
| 6,224,097 B1 * | 5/2001 | Lewis .......................... 280/737 |
| 6,298,789 B1 | 10/2001 | Ericsson et al. | |
| 6,328,336 B1 * | 12/2001 | Takahashi et al. ........... 280/737 |
| 6,543,806 B1 | 4/2003 | Fink | |
| 7,137,646 B2 * | 11/2006 | Blackburn et al. .......... 280/737 |
| 7,347,449 B2 * | 3/2008 | Rossbach et al. ............. 280/737 |
| 7,401,808 B2 * | 7/2008 | Rossbach et al. ............. 280/737 |
| 2007/0138776 A1 * | 6/2007 | Rossbach et al. ............. 280/737 |

FOREIGN PATENT DOCUMENTS

EP      1 493 638 A1      1/2005

\* cited by examiner

*Primary Examiner*—Faye M. Fleming
(74) *Attorney, Agent, or Firm*—Sally J Brown; Madison IP, P.C.

(57) ABSTRACT

A stored gas inflator having a chamber. The chamber houses a quantity of stored gas. The chamber is sealed by a burst disk. A frangible support is also added. The frangible support is designed to support the burst disk. The frangible support breaks during deployment of the inflator. The inflator is further constructed such that when the temperature of the inflator exceeds a threshold level, the gas is vented out of the chamber through the frangible member.

20 Claims, 8 Drawing Sheets

INFLATOR WITH FRANGIBLE SUPPORT

BACKGROUND OF THE INVENTION

Airbag and airbag systems are now a requirement on all new motor vehicles sold in the United States. These systems have been credited in saving many lives and preventing many serious injuries. In many vehicles, multiple airbag systems are used. Some of the commonly known airbag systems include driver's airbag systems (which are usually positioned in the steering wheel), passenger airbag systems, inflatable curtain airbag systems, knee airbag systems, overhead airbag systems, etc.

Airbag systems are generally designed such that in the event of an accident or crash, an airbag will be inflated and deployed into the interior of the vehicle. This airbag will be positioned in front of the steering wheel, the dashboard, the vehicle door, and/or other portions of the vehicle interior. Accordingly, during the crash, the occupant impacts the inflated airbag rather than the surface of the vehicle interior, and as such, the likelihood that the occupant will be injured in the crash is greatly diminished.

Airbag systems will generally include an airbag inflator (which is also referred to simply as an "inflator"). An inflator is a device that is capable of rapidly producing and/or channeling a large quantity of gas into the undeployed airbag. When the vehicle is experiencing crash conditions, a signal is supplied to the inflator which causes the inflator to produce and/or channel the inflation gas into the undeployed, stowed airbag. In turn, this influx of gas into the undeployed airbag causes the airbag to deploy and become positioned within the interior of the vehicle.

Some inflators are referred to as "stored gas" inflators in that they include a chamber that houses a quantity of stored gas (such as nitrogen gas). This chamber is generally sealed such that the stored gas is housed under pressure. Accordingly, in the event of an accident, the stored gas chamber is "unsealed" and the stored gas is allowed to rapidly vent out of the chamber. Upon exiting the chamber, the gas is channeled into the airbag and used to inflate the airbag.

Because the gas is housed within the stored gas inflator under pressure, regulations have been imposed which are designed to ensure the safety of stored gas inflators during a fire. Such fire conditions may occur while the inflator is being shipped, while the inflator is being stored in a warehouse or other facility, or after the inflator has been installed onto a vehicle. Specifically, if the stored gas inflator is involved in a fire, the heat associated with the fire may cause the pressure of the stored gas inside the inflator to increase. If the pressure of the gas increases beyond a threshold level, the structural integrity of the inflator may be compromised and the inflator may become propulsive (i.e., explode). Accordingly, some governmental agencies have imposed regulations which require that all stored gas inflators have a method to safely vent the stored gas out of the inflator in the event that the inflator is involved in fire conditions. By venting this gas out of the inflator, the internal pressure of the inflator is drastically reduced and the inflator is prevented from becoming propulsive.

To date, the mechanisms used by manufacturers to vent the gas out of the inflator in the event of a fire are complex and costly. Accordingly, a new type of stored gas inflator is needed that includes a simple and cost-effective mechanism for venting the gas out of the inflator in the event of a fire. Such a device is disclosed herein.

BRIEF SUMMARY OF THE INVENTION

Various embodiments of an inflator are described herein. In some embodiments, the inflator comprises a chamber housing a quantity of stored gas and a burst disk that seals the chamber. A frangible support is also added to the inflator. The frangible support supports the burst disk. The frangible support breaks during deployment permitting the burst disk to fail and allowing stored gas to exit the chamber. If the temperature of the inflator exceeds a threshold temperature level, thereby causing the pressure of the stored gas to exceed a threshold pressure level, the frangible support allows a venting opening to form in the burst disk such that gas is vented out of the chamber through the burst disk and the frangible member. Such venting of the gas may prevent the inflator from becoming propulsive.

Other embodiments may be designed in which the frangible support includes a hole through which gas vents when the temperature exceeds a threshold level. The burst disk may further comprise a pressure release area positioned proximate the hole. This pressure release area may open into the venting opening if the temperature exceeds a threshold level. In yet additional embodiments, the deployment of the inflator causes the hoop strength of the frangible support to fail, thereby permitting the burst disk to also fail and allow the gas to exit the chamber.

Additional embodiments may be designed in which the inflator further comprises a diffuser positioned proximate an exit opening in the inflator. The quantity of stored gas may pass through the diffuser prior to exiting the inflator. In other embodiments, the frangible support may surround a portion of an initiator. A quantity of pyrotechnic material that is ignited during deployment may, in some embodiments, also be used.

In some embodiments, the frangible support comprises a head portion attached to two arms. In other embodiments, the frangible support comprises a head portion and a cylindrical portion and two end walls, wherein the end walls are attached to the cylindrical portion. In further embodiments, the frangible support comprises a cylindrical portion and an engaging ring.

In other embodiments, an initiator may be added to the inflator. The initiator is constructed to fail the burst disk during deployment, wherein if the burst disk is failed, the stored gas will exit the chamber. In further embodiments, the inflator may be designed such that when the venting opening is formed and the gas is allowed to exit the chamber, the gas flows around the initiator, around a wall in the frangible support, and out of the inflator through an exit opening.

Further embodiments relate to a frangible support for use in an inflator comprising a chamber housing a quantity of stored gas and a burst disk that seals the chamber, the burst disk including a pressure release area, wherein the frangible support comprises a head portion and a hole that is adjacent the pressure release area of the burst disk. In these embodiments, the frangible support breaks during deployment permitting the burst disk to fail and allowing stored gas to exit the chamber. If the temperature of the inflator exceeds a threshold temperature level, thereby causing the pressure of the stored gas to exceed a threshold pressure level, the frangible support allows a venting opening to form in the burst disk such that gas is vented out of the chamber through the burst disk and the frangible member.

The present embodiments relate to a new type of stored gas inflator. The inflator includes a chamber that stores or houses a quantity of gas. This gas may be used to inflate an airbag in the event of an accident or crash. A burst disk is added to the chamber to seal the chamber and hold the gas within the chamber.

An initiator may also be included in the inflator. Activation of the initiator is designed to rupture or fail the burst disk. Once the burst disk is ruptured, the gas can exit the chamber and be channeled into the airbag.

A frangible support member (or "frangible support") is also added to the inflator. The support is frangible, which means that the support will break or rupture during deployment of the inflator. The support is designed to contact the burst disk. The support is also designed to provide structural support to the burst disk. In some embodiments, the structural integrity and/or support provided by the support to the burst disk is necessary in order to prevent the internal pressure of the gas from overcoming the strength of the burst disk. In other words, if the support ruptures, is removed, or otherwise fails, the support does not provide sufficient support to the burst disk such that the internal pressure of the stored gas causes the burst disk to fail.

In some embodiments, the support may include a cylindrical portion. This cylindrical portion may surround and/or enclose a portion of the initiator. A head portion may be positioned proximate the cylindrical portion. In some embodiments the head portion is attached to the cylindrical portion. The head portion may also contact the burst disk. A hole may be positioned on the head portion. At the location of the hole, the frangible support does not provide structural support to the burst disk. Accordingly, the area adjacent to the hole is unsupported by the frangible support and is weaker than other portions of the burst disk. (The area of the burst disk that is adjacent to the position of the hole is referred to as the pressure release area.)

During deployment of the inflator, the initiator breaks or ruptures the frangible support. Once this frangible support is ruptured/broken, the frangible support no longer provides adequate support to all or a portion of the burst disk. Accordingly, as the burst disk is no longer supported, the internal pressure of the gas in the chamber pushes against the burst disk and causes the burst disk to rupture or fail. Once the burst disk is failed, the gas flows out of the chamber and into the airbag.

The inflators of the present embodiments are also capable of allowing the gas to vent out of the chamber when the temperature exceeds a threshold level. Such venting of the gas occurs even though the inflator has not been deployed. When the temperature exceeds a threshold level, the ambient heat from the surroundings will be transmitted to the inflator. This influx of heat to the inflator increases the temperature of the gas housed in the chamber. In turn, such an increase in temperature of the gas also increases the pressure of the gas housed within the chamber. When the temperature exceeds the specified threshold level, the increased pressure of the gas will cause the pressure release area to rupture/fail. Because the pressure release area is not supported by the support, the pressure release area is the area of the burst disk that will fail, whereas the other portions of the burst disk, which are supported by the (unbroken) frangible support, remain structurally intact. In some embodiments, the gas presses against the pressure release area and causes the pressure release area to rupture. In some embodiments, this failure of the pressure release area forms a venting opening in the burst disk through which gas may vent out of the chamber. Once the pressure release area has failed, the gas may flow out of the chamber through the pressure release area. After exiting the chamber, the gas may then flow out of the inflator. Such venting of the gas out of the inflator reduces the pressure within the chamber and prevents the inflator from becoming propulsive.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
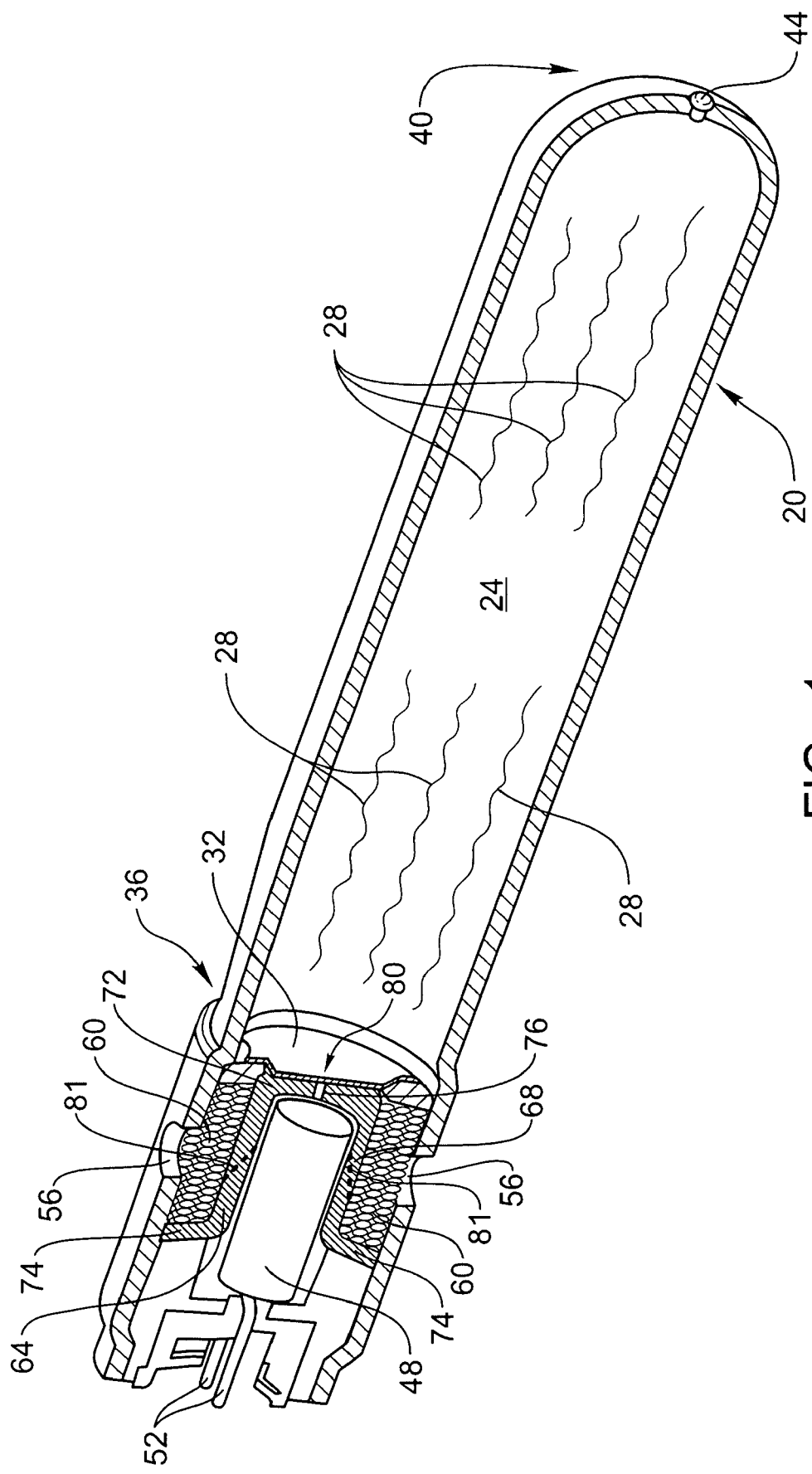
FIG. 1 is a cross-sectional view of an airbag inflator according to the present embodiments, wherein the inflator is shown in the undeployed configuration.

Referring now to FIG. 1, an airbag inflator 20 according to the present embodiments is illustrated. The airbag inflator 20 is a stored gas inflator. Accordingly, the inflator 20 includes a chamber 24 that houses a quantity of stored gas 28. The inflator 20 is designed such that in the event of an accident or crash, the gas 28 is rapidly channeled out of the inflator 20 into an airbag (not shown). Such an influx of gas 28 into the airbag inflates and deploys the airbag during the crash.

As shown in FIG. 1, the chamber 24 is generally cylindrical in shape. Other shapes and/or configurations for the inflator 20 are also possible. The amount of gas 28 stored in the chamber 24 is generally sufficient to inflate an airbag in the event of an accident or crash. Accordingly, the exact amount of gas 28 in the chamber 24 may depend upon a variety of factors including the size of the airbag, the desired speed of inflation, the distance between the inflator and the airbag, etc.

The chamber 24 may be sealed by a burst disk 32 to prevent the gas from leaking out of the inflator 20. The burst disk 32 may be "disk-shaped" and may be positioned at a first end 36 of the chamber 24. Other shapes, configurations, locations and/or positions of the burst disk 24 are also possible. A second end 40 of the chamber 24 may be sealed by a plug 44. This plug 44 is added in order to facilitate the introduction of the gas 28 into the chamber 24 during the manufacturing process. Specifically, when the inflator 20 is constructed, it will generally be manufactured without any of the stored gas 28. The gas 28 may then be introduced into chamber 24 via an opening at the second end 40. Once a sufficient quantity of gas 28 has been added to the chamber 24, the opening at the second end 40 will be sealed by the plug 44 in order to ensure that the gas 28 does not leak out of the chamber 24. In some embodiments, the plug 44 will be welded shut. In other embodiments, there will be a "press fit" between the plug 44 and the opening. Other means and/or ways for sealing the second end 40 may also be used.

An initiator 48 may also be included in the inflator 20. The initiator 48 is a device that is capable of causing the inflator 20 to deploy. Specifically, if a signal indicating crash conditions is sent to the initiator 48, via wires 52, a pyrotechnic event will occur within the initiator 48. The burst disk 32 will rupture and allow the gas 28 to escape the chamber 24. Once the gas 28 leaves the chamber 24, the gas may exit the inflator 20 via one or more exit openings 56 and may be used to deploy the airbag.

In some embodiments, a diffuser 60 may be positioned in front of the exit openings 56. Accordingly, the gas 28 must pass through the diffuser 60 prior to exiting the inflator 20. In some embodiments, diffuser 60 operates to cool and/or filter the gas 28 prior to exiting the inflator 20.

In the embodiment shown in FIG. 1, a support member 64 (or "support") may be used in conjunction with the burst disk 32. The support 64 may contact the burst disk 32 and may be designed to provide structural support the burst disk 32 during storage. By providing structural support to the burst disk 32, the support 64 prevents the internal pressure of the gas from overcoming the strength of the burst disk 32 (and thus causing the burst disk 32 to rupture or fail).

In some embodiments, including the embodiment shown in FIG. 1, the support 64 may surround all or a portion of the initiator 48. Further, the support 64 may be a "thin cup" made of metal, plastic, or other similar materials. In some embodiments, the support 64 may be stamped, die cast, machined, or otherwise formed into its proper configuration. In further embodiments, the support 64 is constructed of a powdered metal that has been sintered together.

In the embodiment shown in FIG. 1, the support 64 includes a cylindrical portion 68. This cylindrical portion 68 may be designed to surround and/or enclose a portion of the initiator 48. A head portion 72 may be positioned proximate the cylindrical portion 68. In some embodiments the head portion 72 is attached to the cylindrical portion 68. The head portion 72 is a wall or other similar structure that contacts the burst disk 32. By contacting the burst disk 32, the head portion 72 provides structural support to the burst disk 32 and prevents the burst disk 32 from rupturing and/or unsealing the chamber 24. An end wall 74 may be attached to the cylindrical portion 68. As shown in FIG. 1, two end walls 74 may be used.

A hole 76 may be positioned on the head portion 72. The hole 76 is an opening or cleft that is added to the support 64. At the location of the hole 76, the support 64 does not provide structural support to the burst disk 32. This area of the burst disk 32 that is adjacent to the position of the hole 76 is referred to as the pressure release area 80. As no portion of the support 64 contacts the pressure release area 80, the pressure release area 80 is weaker than other portions of the burst disk 32. In the embodiment shown in FIG. 1, the hole 76 is positioned proximate the center of the head portion 72 and the pressure release area 80 is positioned proximate the center of the burst disk 32. Other shapes, configurations, and/or positions for the hole 76 and/or pressure release area 80 are also possible.

The support 64 is frangible. As used herein, the term "frangible" means that the support is capable of being broken or ruptured. In general, the frangible support 64 has sufficient structural integrity such that it will not break during shipping or storage of the inflator 20 and/or operation of the vehicle. However, as is described herein the frangible support 64 will break during deployment of the inflator 20. In some embodiments, one or more score lines 81 (or other marks) that are designed facilitate and/or control the breaking of the support 64. The exact configuration and/or pattern of the score lines 81 may depend upon the particular embodiment. If score lines 81 are used, the frangible support 64 will generally break/rupture along the score lines 81 during deployment of the inflator 20.

As used herein, the terms "rupture" or "break" (and grammatical equivalents thereof) refer to any type of failing of the component's structural integrity. In some embodiments, this may involve fissuring the component into one or more pieces. In other embodiments, this failure may involve shattering the component. In further embodiments, such failure may involve introducing one or more holes or apertures into the component.

Figure 2A:
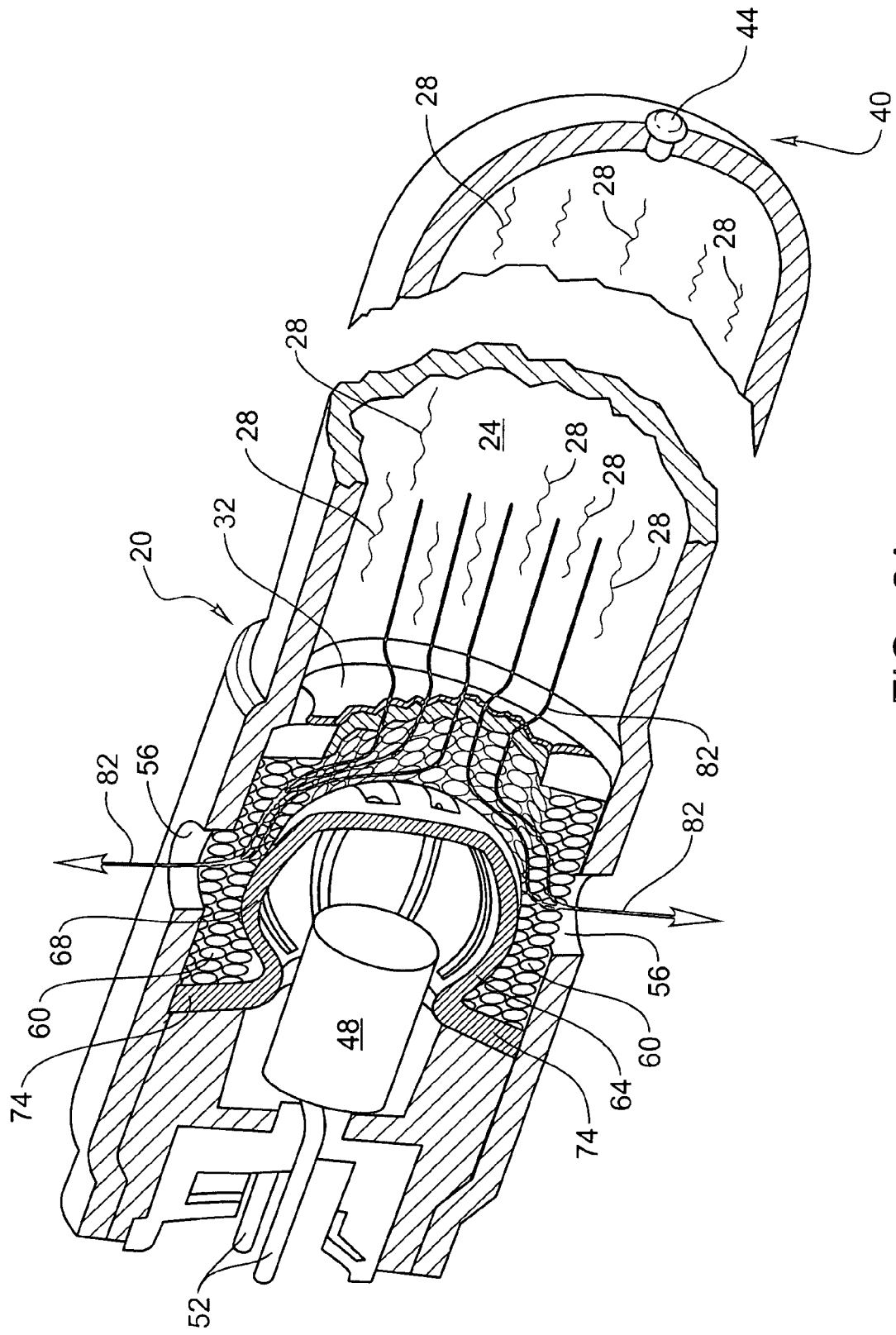
FIG. 2A is a cross-sectional view which shows the way in which the inflator of FIG. 1 is deployed in the event of an accident or crash.

FIG. 2A is a cross-sectional view of the inflator 20 that is similar to the view shown in FIG. 1. FIG. 2A illustrates the deployment of the inflator 20. Specifically, when the vehicle is experiencing crash conditions, a signal (which may be in the form or an electrical charge or and electrical current) is sent to the inflator 20 via the wires 52. Upon receipt of this signal, the initiator 48 is activated. In some embodiments, the initiator 48 comprises a pyrotechnic charge (not shown). Accordingly, the influx of the electrical signal or electrical current to the initiator 48 may ignite the pyrotechnic charge. In turn, this ignition of the pyrotechnic charge breaks or ruptures all or a portion of the frangible support 64. In other embodiments, the initiator 48 may (after activation) break and/or rupture the frangible support 64 in other ways and/or using other means.

In some embodiments, the ignition of the initiator 48 actually ruptures and/or burns through a portion of the burst disk 32. However, in other embodiments, the initiator 48 does not rupture or burn through the burst disk 32. Rather, the ignition of the initiator 48 operates to break/fail the frangible support 64. In some embodiments, the ignition of the initiator 48 causes the support 64 to break along score lines 81 (shown in FIG. 1). Once this frangible support 64 is ruptured/broken, the frangible support 64 can no longer provide adequate support to all or a portion of the burst disk 32. Accordingly, as the burst disk 32 is no longer supported by the support 64, the internal pressure of the gas 28 in the chamber 24 pushes against the burst disk 32 and causes the burst disk 32 to rupture or fail. Other mechanisms for rupturing the burst disk 32 may also be used.

Once the burst disk 32 has been ruptured, the gas 28 is no longer trapped within the chamber 24. Rather, the gas 28 can freely flow out of the chamber 24. Once the gas flows out of the chamber 24, the gas 28 may pass through the diffuser 60 and exit the inflator 20 via the exit openings 56. The flow path of the gas 28 as it exits the inflator 20 is illustrated with arrows 82. As the gas 28 exits the inflator 20, the gas 28 may then be channeled into the airbag (not shown in FIG. 2A) and used to inflate/deploy the airbag.

During deployment of the inflator 20, fragments of the frangible support 64, the initiator 48, and/or the burst disk 32 may be created during the ignition process. In some embodiments, the diffuser 60 may filter out these particles/fragments from the gas 28, thereby preventing these fragments from escaping out of the inflator 20 and/or entering the airbag.

Figure 2B:
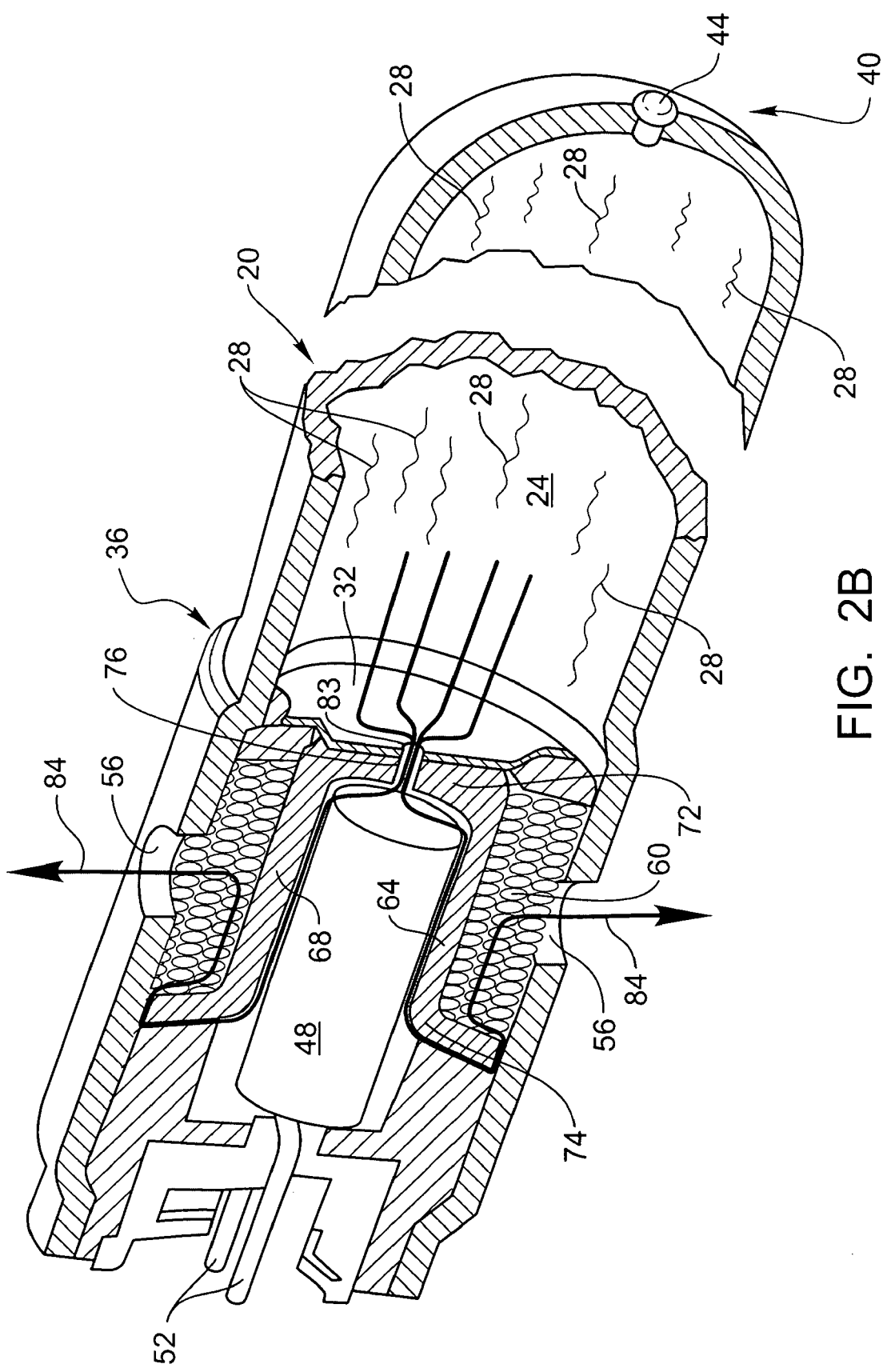
FIG. 2B is a cross-sectional view of the way in which gas may vent out of the inflator of FIG. 1 in the event that the inflator is involved in a fire (or other similar situation)

Referring now to FIG. 2B, the way in which the inflator 20 may vent gas 28 out of the inflator 20 in the event of a fire, etc. will now be described. FIG. 2B shows the inflator 20 prior to deployment. As explained above, the inflator 20 may be designed to allow the gas 28 to vent out of the chamber 24 when the temperature of the inflator 20 exceeds a threshold level. This threshold level for the temperature of the inflator 20 is an elevated temperature that would normally be associated with a fire, an explosion, or extreme heat conditions. Such conditions of fire, etc. could occur while the inflator 20 is being shipped or stored or may occur after the inflator 20 has been installed onto a vehicle.

This threshold level at which the inflator 20 begins to vent gas 28 out of the chamber 24 is set such that, even if the inflator 20 is involved in a fire, etc., the structural integrity of the inflator 20 is not compromised. As described above, if the structural integrity of the inflator 20 is compromised during a fire (or during other conditions of extreme heat), the inflator 20 may become propulsive. Accordingly, the threshold temperature at which the inflator 20 vents the gas 28 out of the chamber 24 is set at a level in which the structural integrity of the inflator 20 is maintained so that that inflator 20 does not become propulsive. The exact temperature that constitutes the "threshold level" at which the inflator 20 begins to vent the gas 28 out of the chamber 24 depends on a variety of factors such as the size of the inflator 20, the material used to construct the inflator 20, the structural integrity of the inflator 20, etc. Those of skill in the art will know and understand how to determine/implement the threshold temperature for each particular embodiment in order to prevent the inflator 20 from becoming propulsive.

As described above, the hole 76 in the support 64 is adjacent to the pressure release area 80 of the burst disk 32. At the location of the hole 76, the pressure release area 80 is unsupported by the support 64. Accordingly, the pressure release area 80 (shown in FIG. 1) is weakened (i.e., has less structural integrity than other portions of the burst disk 32).

When the inflator 20 is involved in a fire (or other conditions of extreme heat), the heat from the surrounding will be transmitted to the inflator 20. This influx of heat into the inflator 20 increases the temperature of the gas 28 housed in the chamber 24. In turn, such an increase in temperature of the gas 28 also increases the pressure of the gas 28 housed within the chamber 24. When the temperature exceeds the specified threshold level, the increased pressure of the gas 28 will cause the pressure release area 80 to rupture/fail. Because the pressure release area 80 is not supported by the support 64, the pressure release area 80 is the area of the burst disk 32 that will fail, whereas the other portions of the burst disk 32, which are supported by the (unbroken) frangible support 64, remain structurally intact. Generally, when the pressure release area 80 fails, a venting opening 83 is formed in the burst disk 32.

Once the pressure release area 80 has failed, the gas 28 may flow out of the chamber 24 through the pressure release area 80. After exiting the chamber 24, the gas 28 may then flow through the hole 76 and may pass through the initiator 48. After flowing by the initiator 48, the gas 28 may then flow around the end wall 74, through the diffuser 60 and then exit the inflator 20 through the exit openings 56. This flow path for the venting of the gas 28 is illustrated by arrows 84. Of course, the flow path shown in FIG. 2B is but one example of a flow path that may be used by the gas 28 to vent out of the inflator 20. The exact flow path for the gas 28 may vary depending upon each particular embodiment. However, in all cases, the gas 28 will flow out of the chamber 24 and/or the inflator 20, after the pressure release area 80 has been ruptured. In some embodiments, the pressure release area 80 ruptures and hole is formed. This venting of the gas 28 out of the chamber 24 and/or out of the inflator 20 diffuses the pressure within the chamber 24. Accordingly, such venting of the gas 28 prevents the inflator 20 from becoming propulsive, even if the inflator 20 is involved in a fire.

Figure 3:
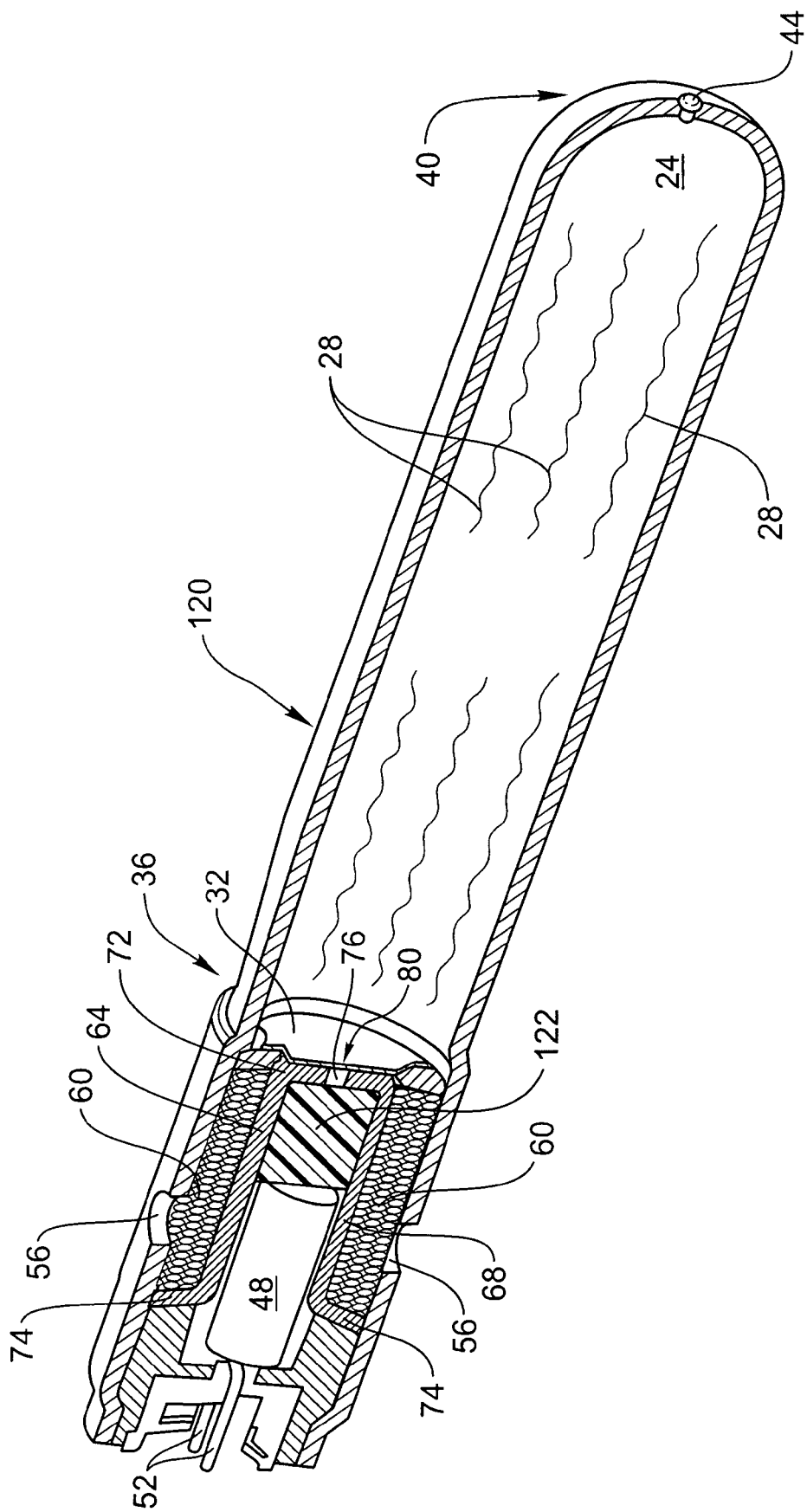
FIG. 3 is a cross-sectional view of another embodiment of an airbag inflator.

Referring now to FIG. 3, a second embodiment of an inflator according to the present embodiments is illustrated. FIG. 3 is a cross-sectional view of inflator 120 which is similar to the inflator 20 discussed above. In fact, the inflator 120 may operate to vent the gas 28 out of the chamber 24 (in the event of a fire, etc.) in a manner that is similar and/or identical to that which is outlined above. Further, the inflator 120 may also deploy in a manner that is similar and/or identical to that which is outlined above. For purposes of brevity, the above-recited discussion will not be repeated.

The inflator 120 differs from the embodiment shown above in that the inflator 20 in that the inflator 120 includes a quantity of pyrotechnic material 122. This quantity of pyrotechnic material may be positioned behind the support 64. More specifically, the pyrotechnic material 122 is positioned between the head portion 72 of the support 64 and the initiator 48. As known in the art, a variety of different materials may be used as the pyrotechnic material 122.

In the event of a fire (or other situation in which the temperature of the gas 28 exceeds the threshold level), the gas 28 may flow through a venting opening 83 created in the pressure release area 80 and then through the hole 76. After passing through the hole 76, the gas 28 may then pass through the pyrotechnic material 122, through the initiator 48, around the end wall 74, through the diffuser 60 and then exit the inflator 120 via the exit openings 56 (in a manner that is similar to that which is shown above in FIG. 2B). Other flow paths for venting the gas 28 are clearly possible.

Further, the pyrotechnic material 122 may also be used in the event that the inflator 120 is deployed. Specifically, when the initiator 48 is activated and deploys, the initiator 48 also ignites the pyrotechnic material 122. This ignition of the pyrotechnic material 122 may create an additional quantity of gas that may further be used to inflate the airbag. However, more importantly, the ignition of the pyrotechnic material 122 creates a quantity of heat as a byproduct of the ignition/combustion of the pyrotechnic material. When the inflator 120 deploys, the gas 28 exits the chamber 24 and then exits the inflator 120 via the openings 56. (This flow path of the gas 28 is described above as shown in FIG. 2A as arrow 82.) However, prior to exiting the inflator 120, the gas 28 can absorb some of the heat that was created by ignition of the pyrotechnic material 122. After absorbing some of the heat from the ignition of the pyrotechnic material 122, the gas 28 will be "hotter" than in some other embodiments. In turn, this heating of the gas 28 by the ignition of the pyrotechnic material 122 may, in some embodiments, provide advantages. Specifically, "hot" inflation gas may inflate the airbag faster and/or to a greater pressure than that which is possible with "cold" inflation gas. In some embodiments, having the airbag inflate faster or to a higher pressure may be desirable.

Figure 4:
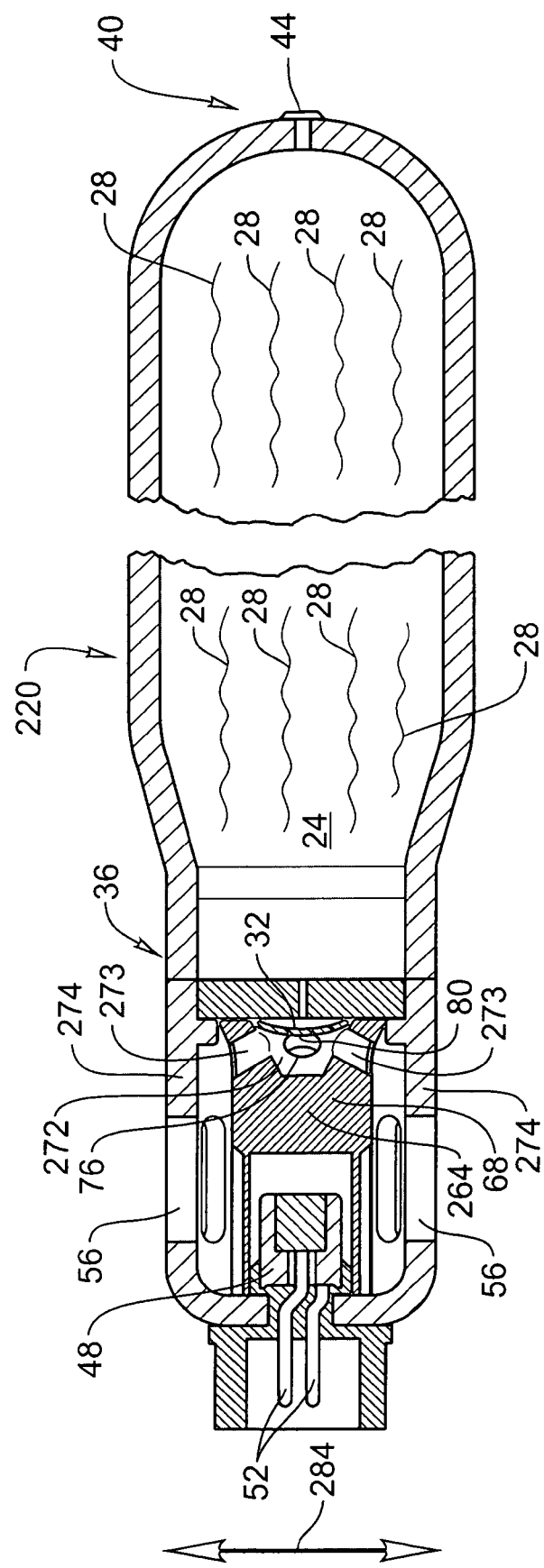
FIG. 4 is a cross-sectional view of another embodiment of an airbag inflator.

Referring now to FIG. 4, another embodiment of an inflator is illustrated. Specifically, FIG. 4 is a cross-sectional view that illustrates an inflator 220 which is similar to the inflators discussed above. The inflator 220 includes a chamber 24 that houses a quantity of inflation gas 28. The gas 28 is held within the chamber 24 via a burst disk 32. The burst disk 32 operates to seal the chamber 24. The burst disk 32 is positioned at the first end 36 of the chamber 24. A plug 44 operates to seal the second end 40 of the chamber 24.

As with the previous embodiment, an initiator 48 is added to the inflator 220. The initiator 220 is designed to deploy the inflator 220 upon receipt of a signal indicating crash conditions. The signal indicating crash conditions may be sent to the inflator 220 via wires 52. During deployment of the inflator 220, the gas 28 is allowed to exit the inflator 220 via the exit openings 56. A diffuser 60 (not shown in FIG. 4) may also be used in conjunction with the inflator 220. The diffuser 60 may be used to filter particles (formed during deployment) out from the gas 28 to ensure that any such particles do not enter the airbag (not shown). In other embodiments, the diffuser 60 may be used to cool the gas 60 prior to the gas entering the airbag.

As with the previous embodiments, the inflator 220 includes a frangible support 264. The frangible support 264 is designed to support the burst disk 32. Specifically, the frangible support 264 is in direct contact with the burst disk 32 and provides support and/or structural integrity to the burst disk 32. In some embodiments (including the embodiment of FIG. 4), the inflator 220 is designed such that if the support 264 were removed from contact with the burst disk 32, or if the support 264 were compromised in some other manner, the burst disk 32 would rupture/fail under the normal storage pressures associated with housing the gas 28 within the chamber 24.

In the embodiment shown in FIG. 4 the support 264 is frangible. This means that, during deployment of the inflator 220, the support 264 will break. This deployment is described in greater detail herein. In some embodiments, the frangible support 264 may comprise score lines 81 (shown in FIG. 6) that will direct and/or control the breakage of the support 264 during deployment. The frangible support 264 may comprise a cylindrical portion 68. In some embodiments, this cylindrical portion 68 may surround all or a portion of the initiator 48 whereas in other embodiments, the frangible support 264 may simply abut and/or be proximate to the initiator 48.

The frangible support 264 may also include a head portion 272. The head portion 272 may engage the burst disk 32. The head portion 272 may also include at least one hole 76. The head portion 272 may be attached to the cylindrical portion 68. The frangible member 264 is designed to provide sufficient strength in the longitudinal (axial) direction of the inflator 220 to support the burst disk 32. In the embodiment shown in FIG. 4, the head portion 272 may be configured to engage the walls 274 of the inflator 220. The frangible support 264, and more specifically, the head portion 272 provides support and/or strength to the burst disk 32. However, at the location of the hole 76, the burst disk 32 is unsupported. This unsupported area is referred to herein as the pressure release area 80.

The frangible support may further comprise two gas flow ports 273. These gas flow ports 273 may be attached to the head portion 272. The gas flow ports 273 are shown more clearly in FIG. 6.

Figure 5A:
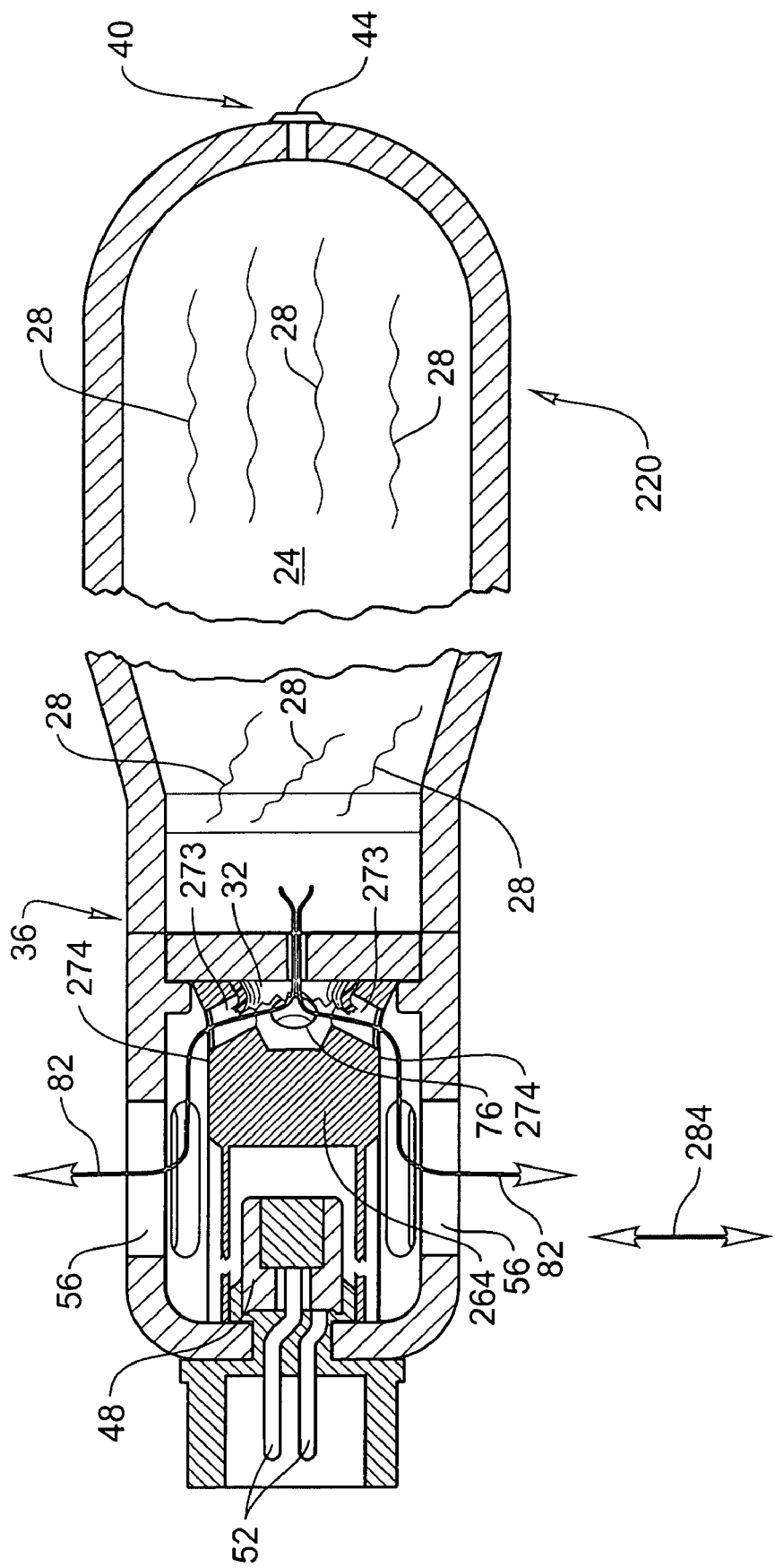
FIG. 5A is a cross-sectional view which shows the way in which the inflator of FIG. 4 is deployed in the event of an accident or crash.

Referring now to FIG. 5A, the deployment of the inflator 220 will now be described. Specifically, upon receipt of the appropriate signal (via the wires 52), the initiator 48 activates. In some embodiments, the initiator 48 comprises a pyrotechnic charge and the activation of the initiator 48 involves igniting/combusting a pyrotechnic charge. The inflator 220 is designed such that activation of the initiator 48 operates to break the frangible support 264. In some embodiments, the heat and/or pressure created by the actuation of the initiator 48 operates to break the frangible support 264. In those embodiments in which the frangible support 264 includes score lines, the actuation of the initiator 48 may cause the frangible support 264 to break along the score lines.

Once the frangible support 264 has been broken, the frangible support 264 is no longer able to provide adequate support to the burst disk 32. In some embodiments, the broken support 264 fails to provide support to the burst disk 32 in the lateral direction. (The lateral direction is indicated by arrow 284.) This failure to provide sufficient lateral support is sometimes referred to as a failure to provide sufficient "hoop strength." However, in other embodiments, the strength and/or structural integrity of the frangible support 264 may fail in other directions after the support 264 has been broken by the actuation of the initiator 48.

Once the strength of the support 264 fails, the support 264 is no longer able to support the burst disk 32. Accordingly, the internal pressure of the gas 28 in the chamber 24 presses against the unsupported burst disk 32 and causes the burst disk to rupture and/or fail. Once the burst disk 32 fails, the gas 28 is no longer bound within the chamber 24. The gas 28 flows out of the chamber 24 and exits the inflator 220 via the openings 56. Once the gas 28 exits the inflator 220, it may be channeled into the airbag.

Embodiments of the inflator 220 may be also made in which the inflator 220, like the inflator 120 of FIG. 3, includes a quantity of pyrotechnic material 122 (shown in FIG. 3). This pyrotechnic material 122 is ignited/combusted during the actuation process and provides an additional quantity of gas that may be used to inflate the airbag. The combustion of the pyrotechnic material 122 may also provide a quantity of heat that may be used to heat the gas 28 as it flows out of the inflator 220.

Figure 5B:
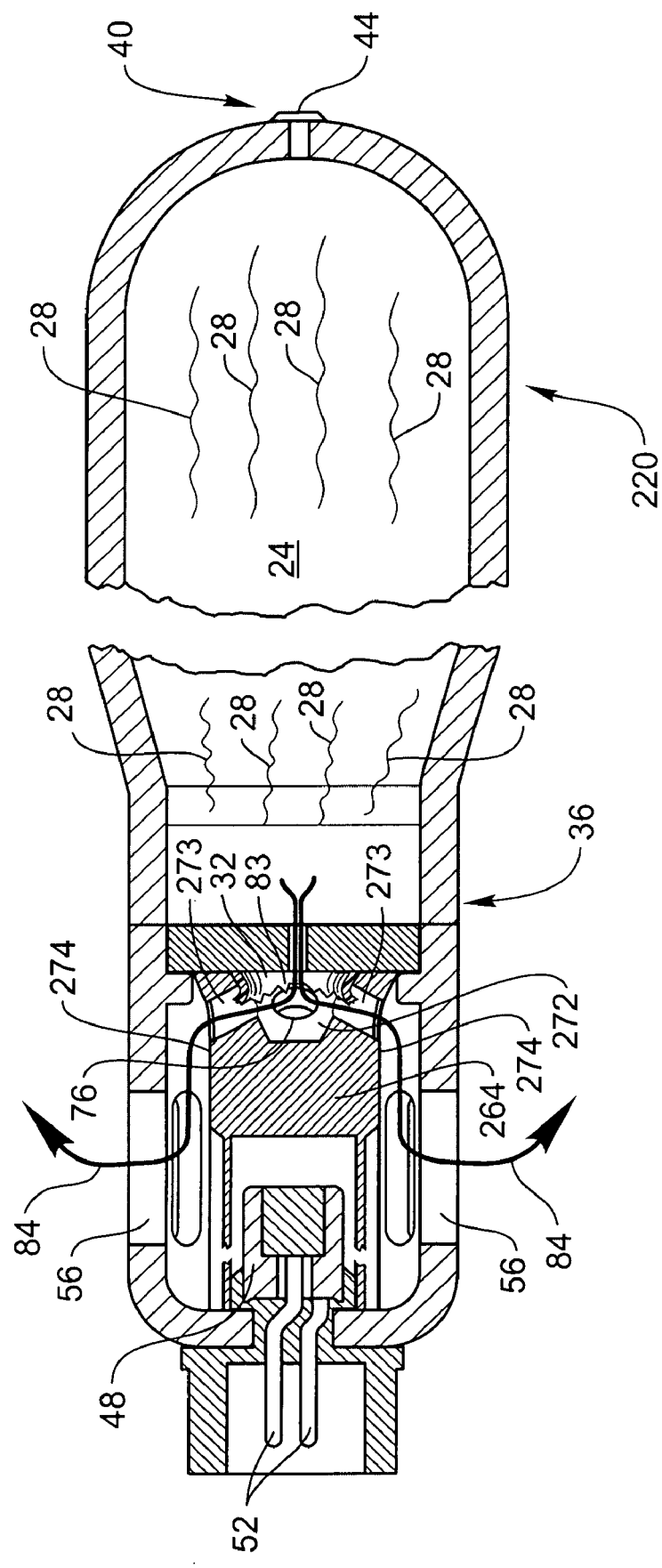
FIG. 5B is a cross-sectional view of the way in which gas may vent out of the inflator of FIG. 4 in the event that the inflator is involved in a fire (or other similar situation)

FIG. 5B illustrates the way in which the gas 28 may be vented out of the inflator 220 in the event that the temperature of the gas 28 exceeds the threshold level. Like FIG. 2B, FIG. 5B shows the inflator 220 prior to any deployment event. Rather, FIG. 5B shows the inflator 220 as the inflator 220 is involved in a fire or other similar event which causes the temperature of the inflator 220 to rise above a threshold level.

As the temperature of the gas 28 increases, the pressure of the gas 28 in the chamber 24 increases. Despite this increase in pressure, the support provided to the burst disk 32 by the unbroken support 264, prevents the burst disk 32 from failing/rupturing. However, as noted above, the pressure release area 80 of the burst disk 32, which is adjacent the hole 76, is not supported by support member 264. Accordingly, when the pressure of the gas 28 exceeds the threshold level (as a result of the increase in heat imparted to the inflator 220 by the fire), the pressure causes the pressure release area 80 to rupture or fail. Such rupturing creates a small venting opening 83 in the burst disk 32 through which the gas 28 may vent out of the chamber 24. As the gas 28 vents out of the chamber 24, the high pressure in the chamber 24 is reduced and the inflator 220 is prevented from becoming propulsive.

As the gas 28 vents out of the chamber 24 via the opening 83, the gas 28 may pass through the hole 76 and exit the inflator 220 through the exit openings 56. In some embodiments, the gas 28 may also flow through the initiator 48. In further embodiments, the venting gas 28 may flow around and/or through all or a portion the unbroken support 264 (such as the cylindrical portion 268). Of course, other flow paths for the venting gas 28 are also possible. All that is required is that the gas 28 vent out of the chamber 24 to alleviate the high pressure within the chamber 24.

Figure 6:
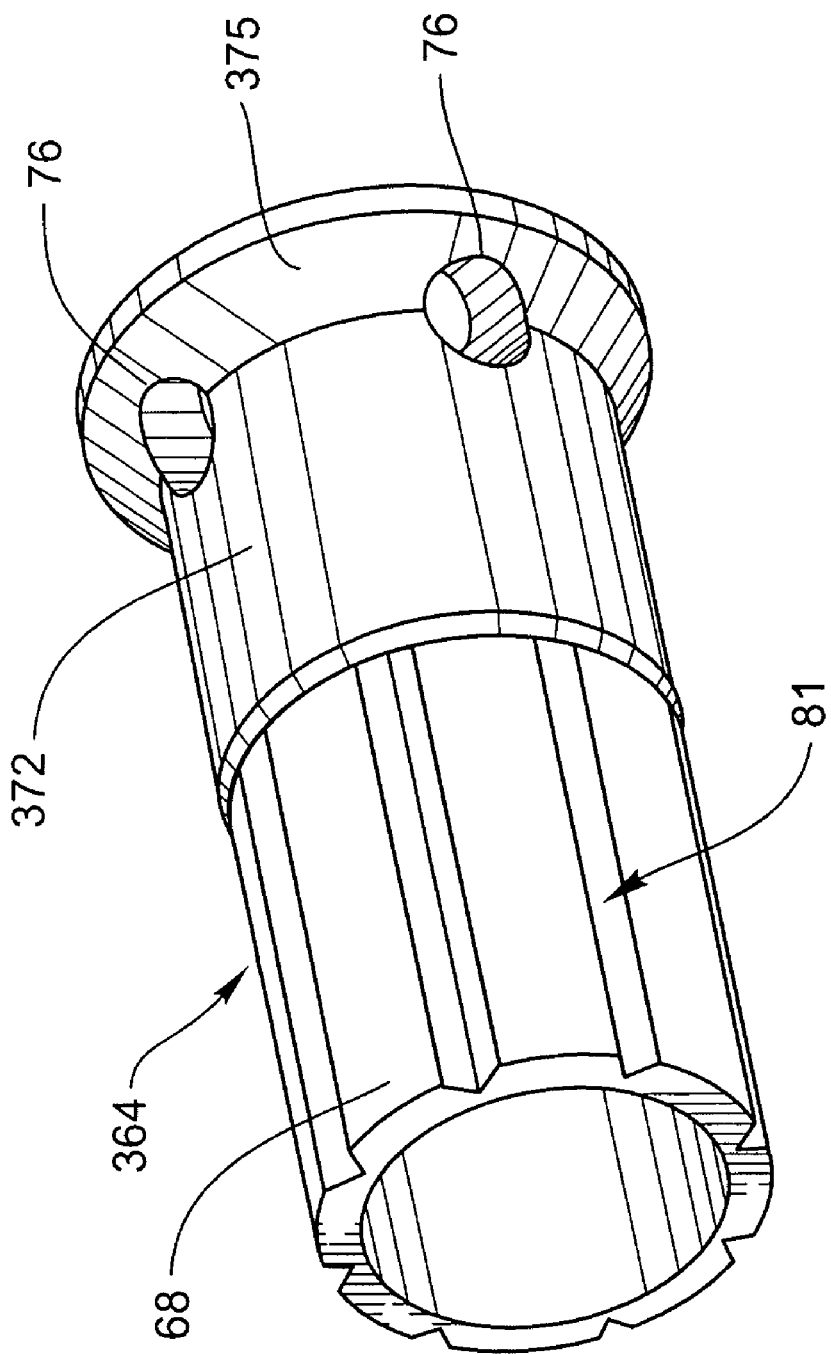
FIG. 6 is a perspective view of an embodiment of a frangible support that may be used as part of the present embodiments.

Referring now to FIG. 6, a perspective view of an additional embodiment of a frangible support 364 is shown. This frangible support 364 is similar to the frangible supports discussed above in FIGS. 1-5B. The frangible support 364 may be used in the inflators 20, 120, 220 discussed above. The frangible support 364 is designed to provide support to the burst disk 32 (not shown in FIG. 6).

The frangible support 364 (or "support member") includes a cylindrical portion 68. In some embodiments, the cylindrical portion 68 is designed to surround all or a portion of the initiator 48 (not shown in FIG. 6). The frangible support 364 also includes a head portion 372. The head portion 372 is designed to contact the burst disk 32 and provide support to the burst disk 32. One or more holes 76 may also be added to the head portion 372. At the location of the hole(s) 76, the support does not provide support to the burst disk 32.

The frangible support 364 may also include an engaging ring 375 that is attached to the head portion 372. This engaging ring 375 is designed to engage and support the burst disk 32. The engaging ring 375 may have a diameter that is greater than the diameter of the head portion 372. Other features and/or elements of the frangible support may also be used.

The frangible support 364 is designed to rupture or break during actuation of the initiator 48. To facilitate this breakage, one or more score lines 81 may be added to the support 364. The score lines 81 are weakened portions of the support 364. The score lines 81 are designed to control the breakage of the frangible support 364. Any pattern of score lines 81 may be used. In other embodiments, the pattern of the score lines 81 is tailored to ensure that the support 364 breaks in the desired manner.

When used as part of an inflator, the frangible support 364 operates similar to the frangible supports discussed above. Specifically, in the event that a crash occurs, the initiator 48 (not shown in FIG. 6) breaks the support 364. Once the support is broken, the support no longer supports the burst disk 32. Without the support of the support member 364, the internal pressure of the gas 28 (not shown in FIG. 6) ruptures the burst disk 32 and allows the gas 28 to escape out of the chamber 24 (not shown in FIG. 6).

The support member 364 also may also provide a mechanism for venting of the gas 28 out of the chamber 24 (not shown in FIG. 6) in the event of a fire or other similar event. Specifically, if the temperature of the inflator exceed a threshold level, the internal pressure of the gas 28 will rupture the member 364. Such rupturing in this area of the burst disk 32 will create a venting opening 83 (not shown in FIG. 6). Once this area of the venting opening 86 (not shown in FIG. 6) has formed, the gas 28 may vent out of the chamber 24 and diffuse the pressure of the gas 28, without causing the inflator to become propulsive.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator comprising:
    a chamber housing a quantity of stored gas;
    a burst disk that seals the chamber;
    a frangible support that supports the burst disk, wherein the frangible support surrounds a portion of an initiator and breaks during deployment permitting the burst disk to fail and allowing stored gas to exit the chamber, wherein if the temperature of the inflator exceeds a threshold temperature level, thereby causing the pressure of the stored gas to exceed a threshold pressure level, the frangible support allows a venting opening to form in the burst disk such that gas is vented out of the chamber through the burst disk and the frangible member.

2. An inflator as in claim 1 wherein the frangible support includes a hole through which gas vents when the temperature exceeds a threshold level.

3. An inflator as in claim 2, wherein the burst disk comprises a pressure release area positioned proximate the hole, wherein the pressure release area opens into the venting opening if the temperature exceeds a threshold level.

4. An inflator as in claim 1 further comprising a diffuser positioned proximate an exit opening in the inflator, wherein the quantity of stored gas passes through the diffuser prior to exiting the inflator.

5. An inflator as in claim 1 wherein the venting of the gas prevents the inflator from becoming propulsive.

6. An inflator as in claim 1 wherein the frangible support surrounds a portion of an initiator.

7. An inflator as in claim 1 wherein the frangible support houses a quantity of pyrotechnic material that is ignited during deployment.

8. An inflator as in claim 1 wherein the hoop strength of the frangible support fails during deployment, thereby permitting the burst disk to fail.

9. An inflator as in claim 1 wherein the frangible support comprises a head portion attached to two arms.

10. An inflator as in claim 1 wherein the frangible support comprises a head portion and a cylindrical portion and two end walls, wherein the end walls are attached to the cylindrical portion.

11. An inflator as in claim 1 wherein the frangible support comprises a cylindrical portion and an engaging ring.

12. An inflator comprising:
    a chamber housing a quantity of stored gas;
    a burst disk that seals the chamber, the burst disk comprising a pressure release area that ruptures when the temperature of the inflator exceeds a threshold level;
    an initiator constructed to fail the burst disk during deployment, wherein if the burst disk is failed, the stored gas will exit the chamber;
    a frangible support that surrounds a portion of the initiator and supports the burst disk, wherein if the temperature of the inflator exceeds a threshold temperature level, thereby causing the pressure of the stored gas to exceed a threshold pressure level, the frangible support allows a venting opening to form in the burst disk such that gas is vented out of the chamber through the burst disk and the frangible member, wherein such venting of the gas prevents the inflator from becoming propulsive.

13. An inflator as in claim 12 wherein the frangible support includes a hole through which gas vents when the temperature exceeds a threshold level.

14. An inflator as in claim 13, wherein the burst disk comprises a pressure release area positioned proximate the hole, wherein the pressure release area opens into the venting opening if the temperature exceeds a threshold level.

15. An inflator as in claim 12 wherein when the venting opening is formed, the gas flows around the initiator, around a wall in the frangible support, and out of the inflator through an exit opening.

16. An inflator as in claim 12 wherein the frangible support comprises a head portion attached to two arms.

17. An inflator as in claim 12 wherein the frangible support comprises a head portion and a cylindrical portion and two end walls, wherein the end walls are attached to the cylindrical portion.

18. An inflator as in claim 12 wherein the frangible support comprises a cylindrical portion and an engaging ring.

19. A frangible support for use in an inflator comprising a chamber housing a quantity of stored gas and a burst disk that seals the chamber, the burst disk including a pressure release area, the frangible support comprising:
   a head portion; and
   a hole that is adjacent to the pressure release area, wherein the frangible support surrounds a portion of an initiator and breaks during deployment permitting the burst disk to fail and allowing stored gas to exit the chamber, wherein if the temperature of the inflator exceeds a threshold temperature level, thereby causing the pressure of the stored gas to exceed a threshold pressure level, the frangible support allows a venting opening to form in the burst disk such that gas is vented out of the chamber through the burst disk and the frangible member.

20. An inflator comprising:
   a chamber housing a quantity of stored gas;
   a burst disk that seals the chamber, the burst disk having a pressure release area;
   a frangible support that supports the burst disk except in the vicinity of the pressure release area, wherein the frangible support breaks during deployment permitting the burst disk to fail and allowing stored gas to exit the chamber, wherein if the temperature of the inflator exceeds a threshold temperature level, thereby causing the pressure of the stored gas to exceed a threshold pressure level, a venting opening forms in the pressure release area of the burst disk such that gas is vented out of the chamber through the burst disk and the frangible member.

* * * * *